(12) United States Patent
Nguyen et al.

(10) Patent No.: US 11,237,339 B2
(45) Date of Patent: Feb. 1, 2022

(54) SECURE MT FERRULE LATCHING WITH MPO ADAPTER

(71) Applicant: US Conec, Ltd, Hickory, NC (US)

(72) Inventors: Hiep V. Nguyen, Fort Mill, SC (US);
Darrell R. Childers, Hickory, NC (US); Shelly Ann Buchter, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/721,795

(22) Filed: Dec. 19, 2019

(65) Prior Publication Data
US 2020/0200977 A1  Jun. 25, 2020

Related U.S. Application Data

(60) Provisional application No. 62/782,670, filed on Dec. 20, 2018.

(51) Int. Cl.
*G02B 6/36* (2006.01)
*G02B 6/38* (2006.01)

(52) U.S. Cl.
CPC ......... *G02B 6/3825* (2013.01); *G02B 6/3831* (2013.01); *G02B 6/3882* (2013.01)

(58) Field of Classification Search
CPC ............................ G02B 6/3825; G02B 6/3882
See application file for complete search history.

(56) References Cited

U.S. PATENT DOCUMENTS

| | | | |
|---|---|---|---|
| 6,217,226 B1 * | 4/2001 | Gibbs ................. | G02B 6/3897 385/139 |
| 7,296,935 B1 | 11/2007 | Childers et al. | |
| 10,133,009 B1 * | 11/2018 | Wu ..................... | G02B 6/3893 |
| 10,761,273 B2 | 9/2020 | Takano et al. | |
| 2011/0044583 A1 * | 2/2011 | Dalton ................ | G02B 6/3825 385/53 |
| 2014/0016901 A1 * | 1/2014 | Lambourn .......... | G02B 6/3897 385/75 |
| 2014/0299645 A1 * | 10/2014 | Lurie ................... | G02B 6/25 225/96 |
| 2019/0079252 A1 * | 3/2019 | Watanabe ........... | G02B 6/3885 |

FOREIGN PATENT DOCUMENTS

| | | |
|---|---|---|
| CN | 111239918 A | 6/2020 |
| WO | 2019111399 A1 | 6/2019 |

* cited by examiner

*Primary Examiner* — Eric Wong
(74) *Attorney, Agent, or Firm* — Michael L. Leetzow, P.A.; Shubhrangshu Sengupta

(57) ABSTRACT

An adapter holds a multi-fiber ferrule in position to mate with a multi-fiber ferrule in a fiber optic connector. The adapter includes an adapter body that has a first opening in a first side of the adapter body that receives the multi-fiber ferrule and a second opening in the second side of the adapter body to removably receive the fiber optic connector. The adapter also includes a pair of latches connected to the adapter and disposed adjacent the first opening to engage and hold the multi-fiber ferrule in the adapter. The pair of latches are connected to the adapter body along longer edges of the first opening and extend in a direction away from the first and the second openings, the pair of latches having a terminal end and a non-uniform thickness between the adapter body and terminal ends.

18 Claims, 11 Drawing Sheets

SECURE MT FERRULE LATCHING WITH MPO ADAPTER

REFERENCE TO RELATED CASE

This application claims priority under 35 U.S.C. § 119 (e) to provisional application No. 62/782,670 filed on Dec. 20, 2018, the contents of which are hereby incorporated by reference in their entirety.

BACKGROUND OF THE INVENTION

There are times that MPO-style connectors need to be mated directly with MT ferrules. One of these times is at the MT backplane of a transceiver on a printed circuit board, where the MT ferrules aid in connection with the transceiver. In high fiber count applications, the MPO-style connectors have a spring biasing a multi-fiber ferrule to mate with another multi-fiber ferrule, such as an MT ferrule. The springs in the fiber optic connector cause the multi-fiber ferrule to exert about a 20N force on the matched MT ferrule. Such a large force exerted on the matched MT ferrule may cause the MT ferrule to be dislocated within or, to be dislodged from, the adapter containing the MPO-style connector and the MT ferrule.

A prior art adapter 10 is illustrated in FIG. 1 that has a multi-fiber ferrule 12 inserted into a first side 14. A fiber optic connector (not shown) would be inserted into a second side 16. The adapter 10 has two latches 18,20 that engage the multi-fiber ferrule 12. The adapter 10 also has two tabs 22 (a second tab is hidden by the multi-fiber ferrule 12). The latches 18,20 and the tabs 22 function to retain the multi-fiber ferrule 12 within the adapter 10. However, the latches 18,20 and the tabs 22 are not very close to the multi-fiber ferrule 12 and allow for a number of gaps 24 between the multi-fiber ferrule 12 and the latches 18,20 as well as the tabs 22. These gaps 24 allow for the multi-fiber ferrule 12 to move around within the adapter 10 even though the multi-fiber ferrule 12 is engaged by the ends 26 of the latches 18,20. The multi-fiber ferrule 12 can move into the gaps 24 (particularly at the front of the multi-fiber ferrule 12), which prevents the multi-fiber ferrules inserted into the adapter 10 from being in optical alignment.

In order to prevent such issues and to better ensure a better mating experience, a new adapter has been designed to prevent the MT ferrule from being dislocated or dislodged from the adapter containing a fiber optic connector with stiffer springs.

SUMMARY OF THE INVENTION

The present invention is directed to an adapter for holding a multi-fiber ferrule in position to mate with a multi-fiber ferrule in a fiber optic connector that includes an adapter body, the adapter body having a first side and a second side, a first opening disposed in the first side of the adapter body and configured to receive the multi-fiber ferrule, the first opening having two shorter edges and two longer edges, a second opening disposed in the second side of the adapter body and in communication with the first opening, the second opening configured to removably receive the fiber optic connector and the first and second openings configured to position the fiber optic connector and multi-fiber ferrule to optically align with one another, and a pair of latches connected to the adapter and disposed adjacent the first opening to engage and hold the multi-fiber ferrule in the adapter, the pair of latches connected to the adapter body along the longer edges of the first opening and extending in a direction away from the first and the second openings, the pair of latches having a terminal end and a non-uniform thickness between the adapter body and terminal ends.

In some embodiments, each of the pair of latches has an interior surface that faces the other of the pair of latches, each of the interior surfaces having at first portion with a first surface lying in a first plane and a second portion having a second surface lying in a second plane, the first and second planes being parallel to but offset from one another.

In some embodiments, the adapter also includes a pair of tabs connected to the adapter and disposed adjacent to the shorter edges of the first opening.

In other embodiments, the adapter also includes a latch stop disposed on each of the pair of latches, the latch stop disposed between the second portion and the terminal end of each of the pair of latches.

In another aspect, the invention is directed to an adapter for holding a multi-fiber ferrule in position to mate with a multi-fiber ferrule in a fiber optic connector that includes an adapter body, the adapter body having a first side and a second side, a first opening disposed in the first side of the adapter body and configured to receive the multi-fiber ferrule, the first opening having two shorter edges and two longer edges, a second opening being disposed in the second side of the adapter body and in communication with the first opening, the second opening configured to removably receive the fiber optic connector and the first and second openings configured to position the fiber optic connector and multi-fiber ferrule to optically align with one another, and a pair of latches connected to the adapter and disposed adjacent the first opening to engage and hold the multi-fiber ferrule in the adapter, the pair of latches connected to the adapter body along the longer edges of the first opening and extending in a direction away from the first and the second openings and having a terminal end, each of the pair of latches further includes a latch stop to engage a long edge of a back end-face of the multi-fiber ferrule adjacent the terminal end of the latch, a latch step extending from the latch perpendicular to the direction in which the latch extends and adjacent the first opening, and a pad extending perpendicular to the direction in which the latch extends and positioned between the latch stop and the latch step.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
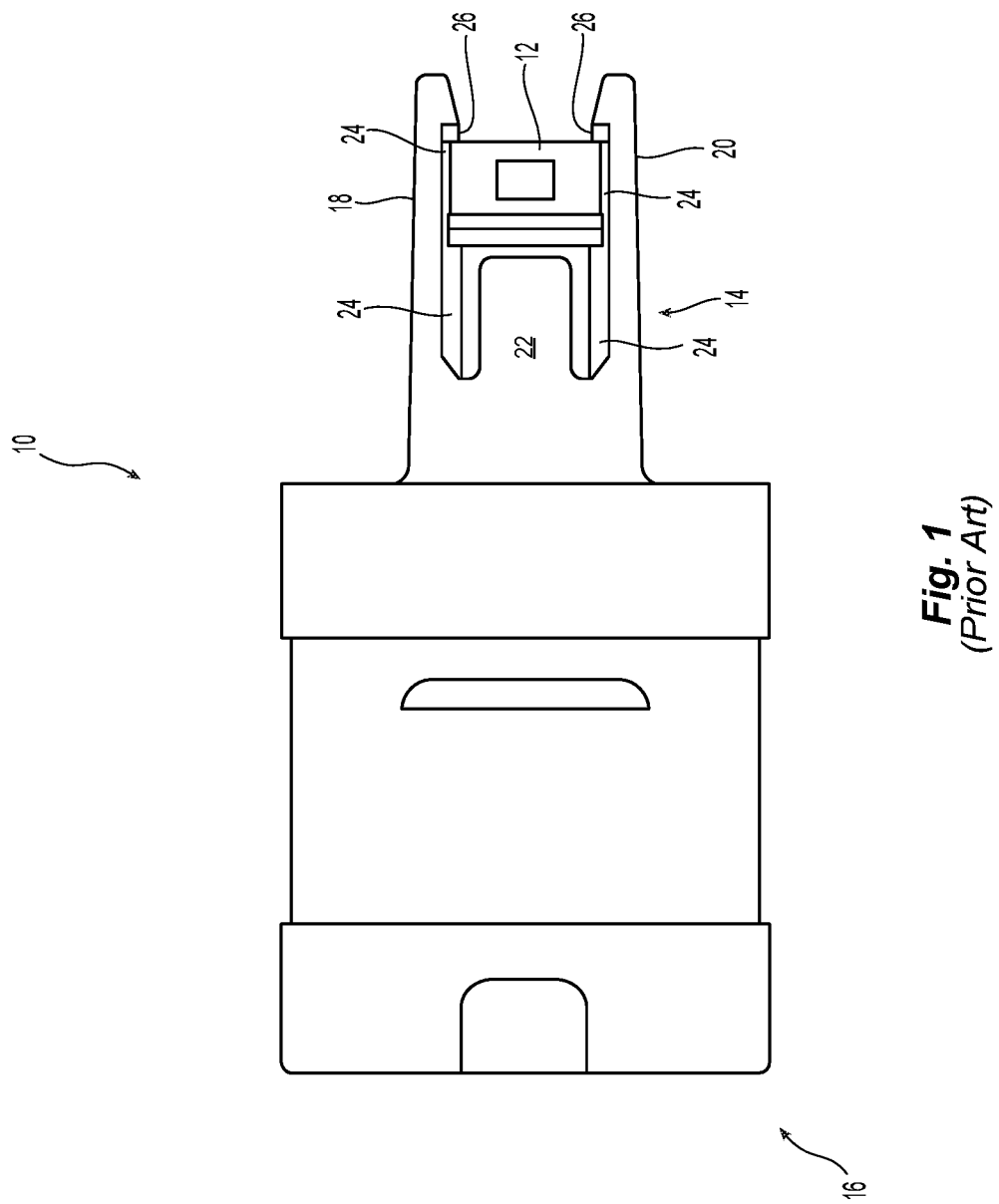
FIG. 1 is a side elevational view of a prior art adapter having a multi-fiber ferrule inserted therein.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
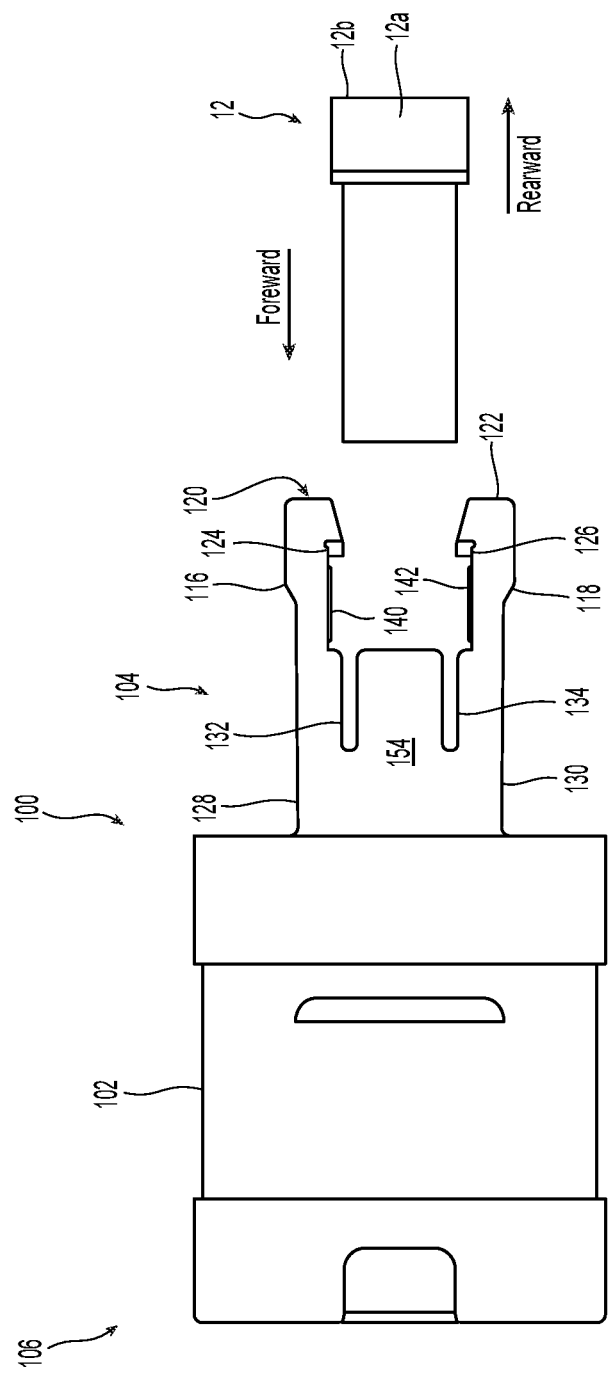
FIG. 2 is a side elevational view of one embodiment of an adapter according to the present invention with a multi-fiber ferrule prior to being inserted into the adapter.

A first embodiment of an adapter 100 according to the present invention is illustrated in FIG. 2. The adapter 100 is also used with the multi-fiber ferrule 12.

The term "front" and "forward" as used herein means that direction where the fiber optic connector or multi-fiber ferrule would mate with another fiber optic connector or device, while the term "rear" or "back" is used to mean the direction from which the optical fibers enter into the fiber optic ferrule. So turning to FIG. 2, the front is the direction shown by the arrow and "back" or "rearward" is the opposite direction. Thus, the front of the multi-fiber ferrule 12 is pointed to the left in FIG. 2 (and into the adapter 100). For a fiber optic connector that would be inserted into the adapter 100 from the left side in FIG. 2, front would be to the right and rearward would be to the left with respect to the fiber optic connector. Thus, the front ends of the multi-fiber ferrules would meet in the middle of the adapter 100.

Figure 3:
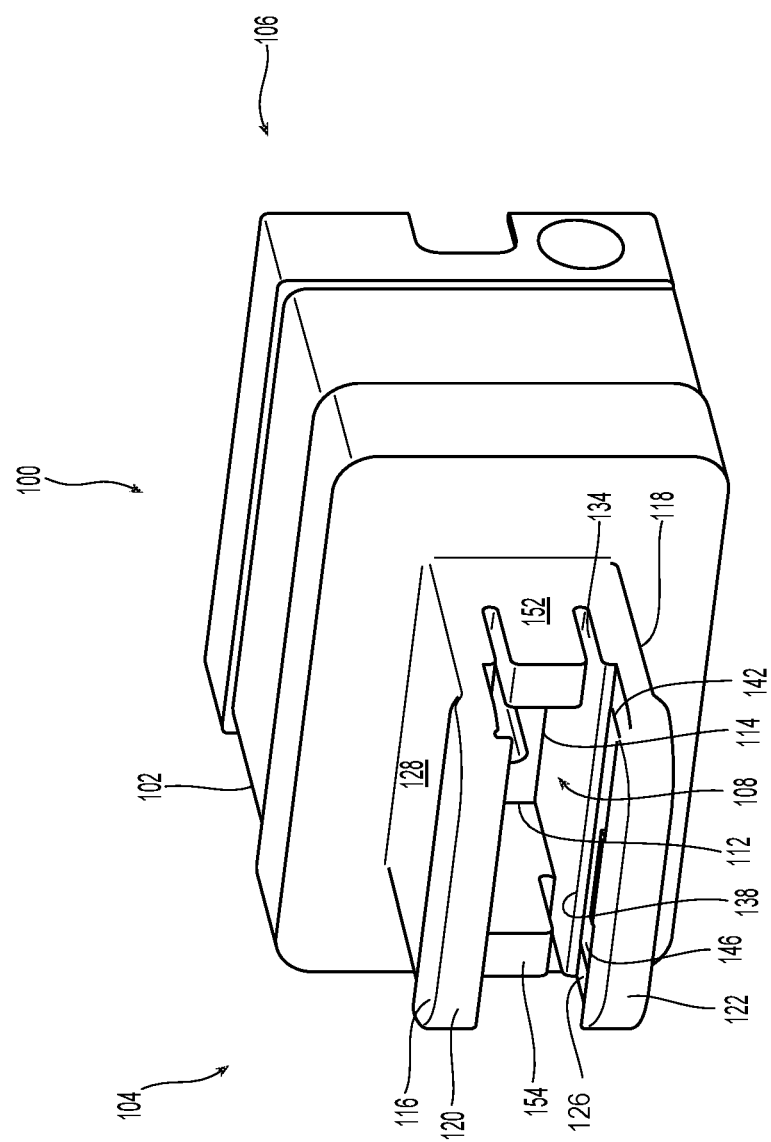
FIG. 3 is a front perspective view of the adapter in FIG. 2.
Figure 4:
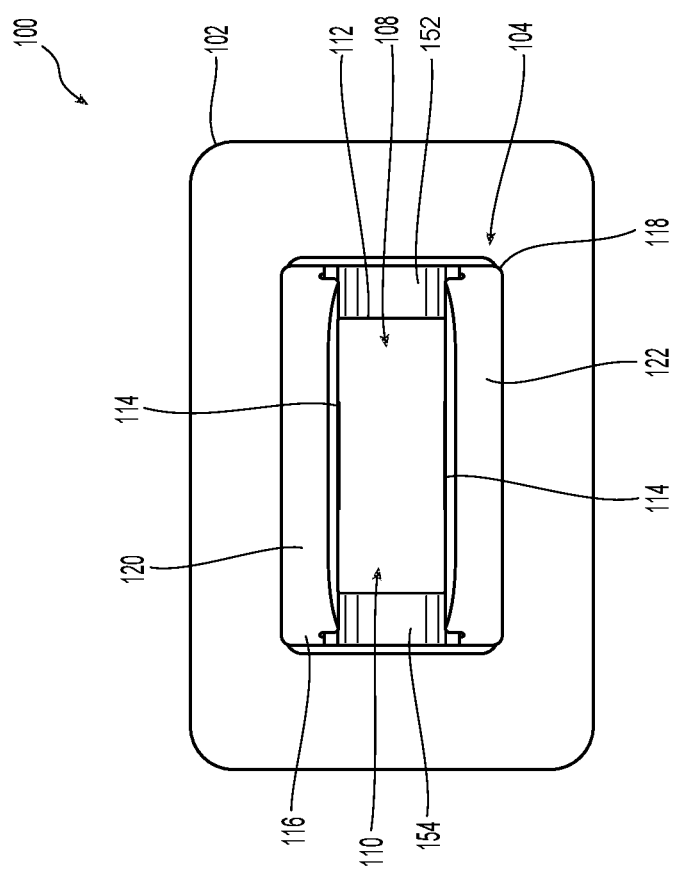
FIG. 4 is a front end view of the adapter in FIG. 2.

Returning to FIG. 2, the adapter 100 is used to mate a multi-fiber ferrule 12 and a fiber optic connector (not shown; e.g., an MPO-style fiber optic connector). The multi-fiber ferrule 12 is inserted into the right side of the adapter 100 as illustrated in FIG. 1 while the fiber optic connector is inserted into the left side of the adapter 100. The adapter 100 has an adapter body 102 with a first side 104 and a second side 106. The first side 104 has an associated first opening 108 (see FIGS. 3, 4, and 6) to receive the multi-fiber ferrule 12 therein. The second side 106 has an associated second opening 110 to removably receive a fiber optic connector therein—allowing the fiber optic connected to be inserted into and removed without affecting the adapter 100, the fiber optic connector, or the multi-fiber ferrule 12. See FIGS. 6 and 9. The first opening 108 and the second opening 110 are in communication with one another in the adapter body 102. This allows for the mating of the multi-fiber ferrule 12 and the fiber optic connector within the adapter 100.

The first opening 108 is preferably rectangular in shape, corresponding to the shape of the multi-fiber ferrule 12. Thus, in one embodiment the first opening 108 has two shorter edges 112 and two longer edges 114. The adapter 100 also has a pair of latches 116,118 attached to the adapter body 102 at the first side 104. Preferably the pair of latches 116,118 are attached to the adapter body 102 along the two longer edges 114 (see FIGS. 3 and 4) and extend away from the adapter body 102 and the second opening 110. Preferably the pair of latches 116,118 are integrally formed with the remainder of the adapter body 102, but could be later added in a number of conventional ways. It is the pair of latches 116,118 that engage the multi-fiber ferrule 12 to retain it in the adapter 100 as discussed in more detail below. Preferably, the pair of latches 116,118 are the same although some of components could be different between the two latches 116,118.

Figure 5:
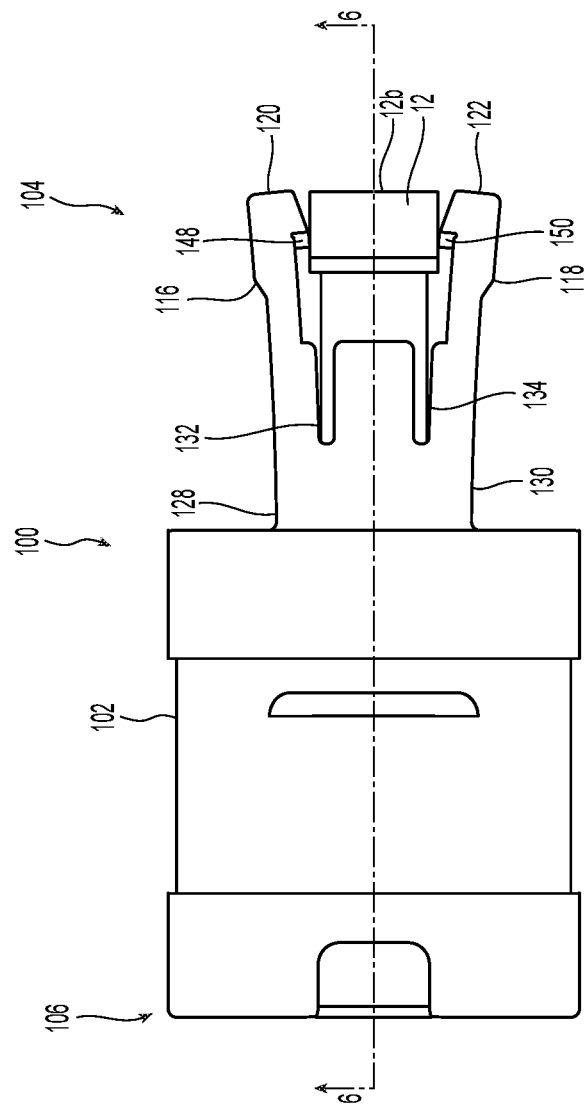
FIG. 5 is a side elevational view of the adapter in FIG. 2 with a multi-fiber ferrule partially inserted.
Figure 6:
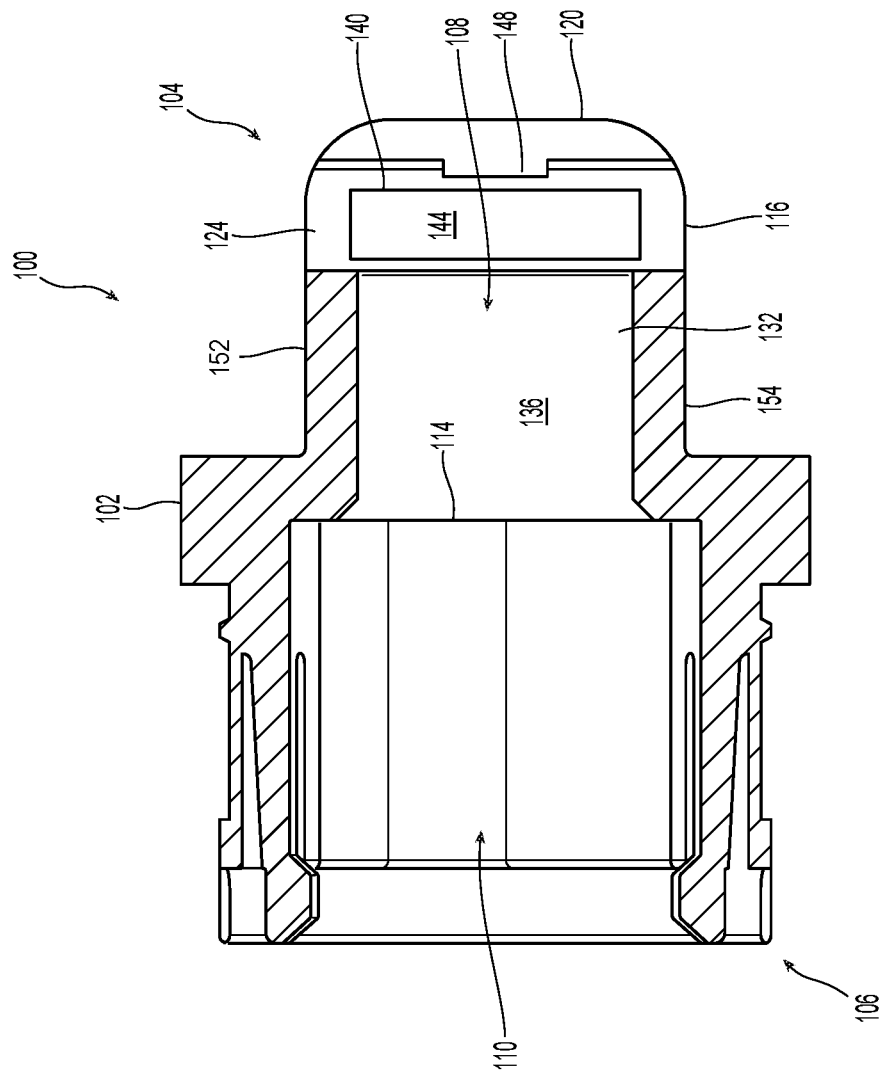
FIG. 6 is a cross sectional view of the adapter in FIG. 3 along the line 6-6.
Figure 10:
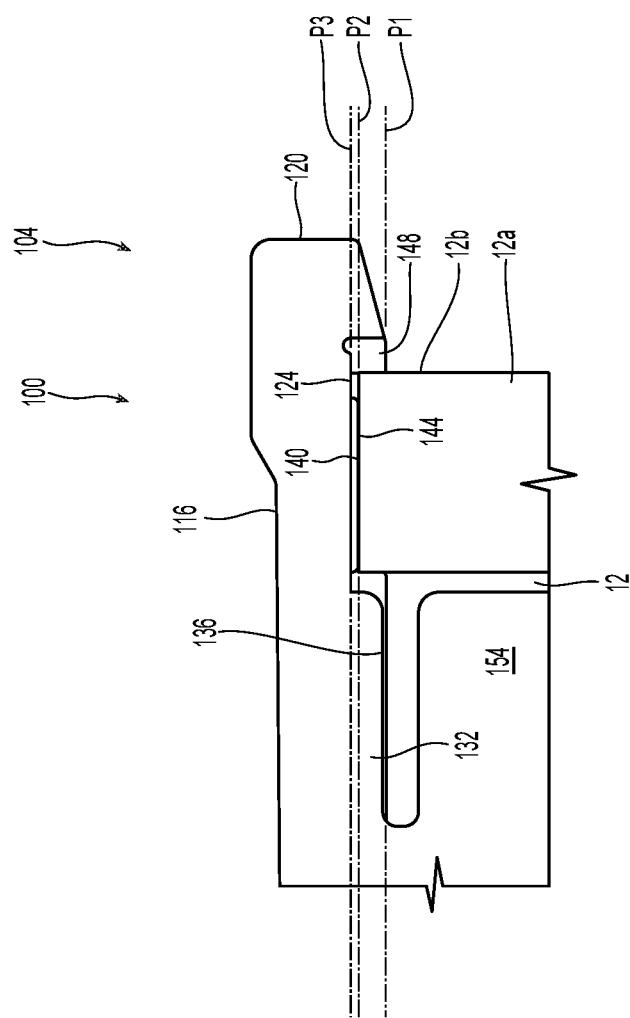
FIG. 10 is an enlarged partial view of the end of an adapter latch and multi-fiber ferrule.

Each of the latches 116,118 extend between the adapter body 102 and terminal ends 120,122 of the latches 116,118. The pair of latches 116,118 have an interior surface 124,126 that face each other and an exterior surface 128,130 that face away from one another. The interior surfaces 124,126 and exterior surfaces 128,130 define a thickness of the pair of latches 116,118, and that thickness is not uniform along the length of the pair of latches 116,118. See, e.g, FIGS. 2 and 10. As best seen in FIGS. 6 and 10, the interior surface 124 has three different surfaces. Beginning closest to the adapter body 102 and away from the terminal end 120, a first surface is generally associated with a latch step or first portion 132/134. The latch step or first portion 132/134 also corresponds to the thickest portion of the latches 116/118 and makes contact with the front end of the multi-fiber ferrule 12. See, e.g., FIGS. 5 and 10. The latch steps or first portions 132/134 each have a surface 136,138 that lie in a first plane P1 on each side of the adapter 100. See FIG. 10 showing one side, the other side being the same.

There is a second surface that is associated with pads or second portions 140,142. The pad or second portion 140,142 is positioned between the latch step or first portion 132/134 and the terminal ends 120,122. The pads or second portions 140,142 each have a surface 144,146 that lie in a second plane P2. See FIG. 10. The second plane P2 is parallel to but also offset from the first plane P1. The pads or second portions 140,142 generally correspond to the location of the shoulder 12*a* of the multi-fiber ferrule 12 when the multi-fiber ferrule 12 is inserted into the adapter 100. Since the shoulder 12*a* of the multi-fiber ferrule 12 is larger than the front portion of the multi-fiber ferrule 12, then the pads or second portions 140,142 need not be as large or as thick as the latch steps or first portions 132/134. Thus, the thickness of the pair of latches 116,118 at the area of the pads or second portions 140,142 is smaller than at the latch steps or first portions 132/134. See FIG. 10. The pads or second portions 140,142 assist in keeping the rearward end of the multi-fiber ferrule 12 from moving within the adapter 100 during engagement with the fiber optic connector inserted on the other side 106 of the adapter 100.

As is also visible in FIG. 10 is the interior surface 124 that lies in a third plane P3. The latch steps or first portions 132/134 and the pads or second portions 140,142 could be thought of as being added to the interior surface 124,126. With reference to FIG. 6, if the latch steps or first portions 132/134 or the pads or second portions 140,142 were smaller (as they could be and still come within the scope of the present invention), then interior surface 124,126 would be larger.

Figure 6A:
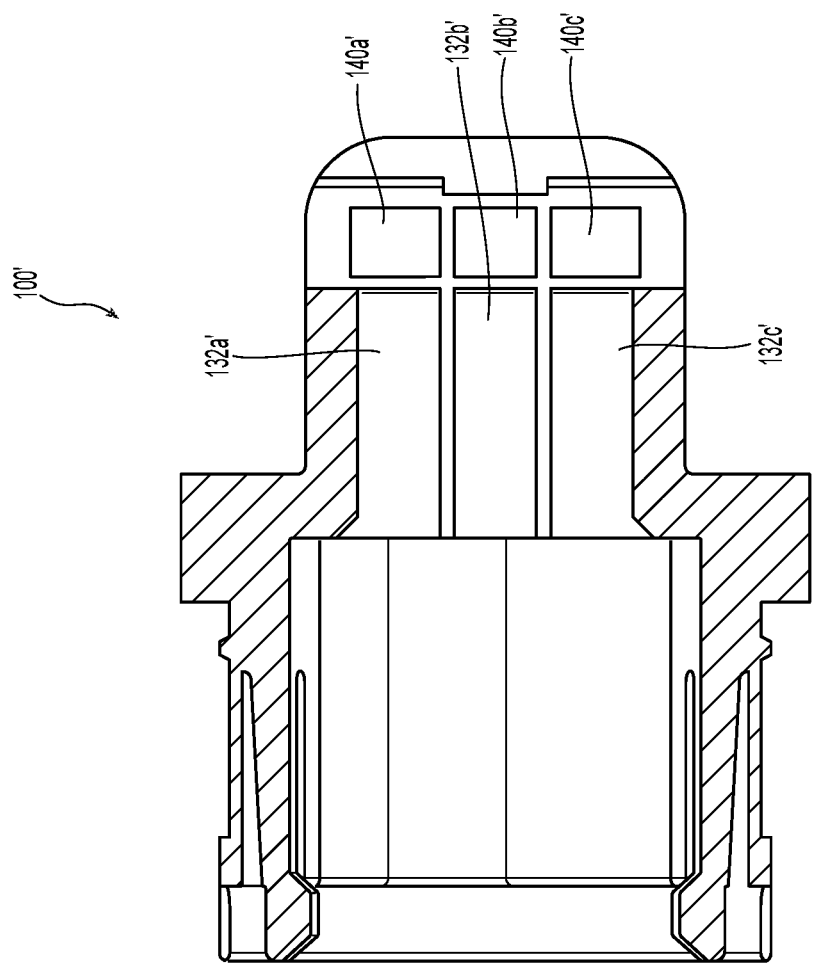
FIG. 6A a cross sectional view of an alternative embodiment of an adapter having multiple portions for the pad and latch step.

It should be noted that while the latch steps or first portions 132/134 or the pads or second portions 140,142 are illustrated as being a singular entity, either or both could be divided into sub-portions as illustrated in FIG. 6A. For example, in another embodiment of an adapter 100', the latch step or first portion could be divided into three sub-portions 132*a'*, 132*b'* and 132*c'* and pad or second portion could also be divided into three sub-portions 140*a'*, 140*b'* and 140*c'*. It is also within the scope of the present invention that there be more or fewer sub-portions and that the sub-portions could have alternate shapes and thicknesses.

Returning to the pair of latches 116,118, there are latch stops 148,150 that are positioned between the pads or second portions 140,142 and the terminal ends 120,122. See, e.g., FIG. 5. The latch stops 148,150 engage the rear face 12*b* of the multi-fiber ferrule 12 to prevent the multi-fiber ferrule 12 from being pushed out of the adapter 100. It should be noted, in particular with reference to FIG. 6, that the latch stops 148,150 are generally centered between the edges of the pair of latches 116,118. This feature accommodates a pin keeper that may be attached to the multi-fiber ferrule 12. The latch stops 148,150 would then be centered between the pin keeper to allow the latch stops, 148,150 to engage the rear face 12*b* of the multi-fiber ferrule 12 and prevent any interference from the pin keeper.

The adapter 100 also has a pair of tabs 152,154 connected to the adapter body 102. The tabs 152,154 are connected to the adapter body 102 adjacent to the two shorter edges 112. The tabs 152,154 assist in keeping the multi-fiber ferrule 12 from moving laterally within the first opening 108.

Figure 7:
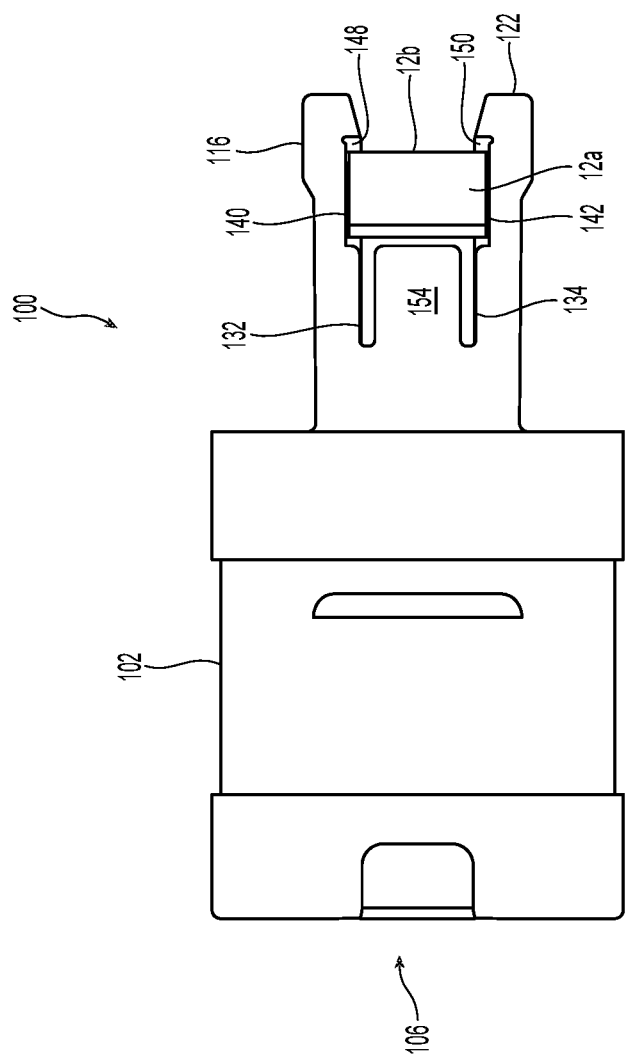
FIG. 7 is a side elevational view of the adapter in FIG. 2 with the multi-fiber ferrule fully inserted therein.

The insertion of the multi-fiber ferrule 12 into the adapter 100 will be explained with reference to FIGS. 2, 5, and 7. The multi-fiber ferrule 12 is oriented to be inserted into the first opening 108 in FIG. 2. The long sides of the multi-fiber ferrule 12 are aligned with the longer edges 114 in the adapter 100. As the multi-fiber ferrule 12 is inserted into the adapter 100, the pair of latches 116,118 flex outwardly. See FIG. 5. It should be noted that the thickness of the pair of latches 116,118 at the second pads or second portions 140,142 is of an appropriate thickness to allow the pair of latches 116,118 to flex and allow the insertion of the multi-fiber ferrule 12. As the multi-fiber ferrule 12 is inserted, the latch steps or first portions 132/134 engage the front portion of the multi-fiber ferrule 12. As the multi-fiber ferrule 12 continues to be inserted, the terminal ends 120, 122 of the pair of latches 116,118 snap back into place as the shoulder 12*a* passes the latch stops 148,150. See FIGS. 7 and 10. The latch stops 148,150 make contact with the rearward face 12*b* of the multi-fiber ferrule 12. The multi-fiber ferrule 12 is now securely inserted into the adapter and will not be dislocated within or to be dislodged from the adapter 100.

Figure 8:
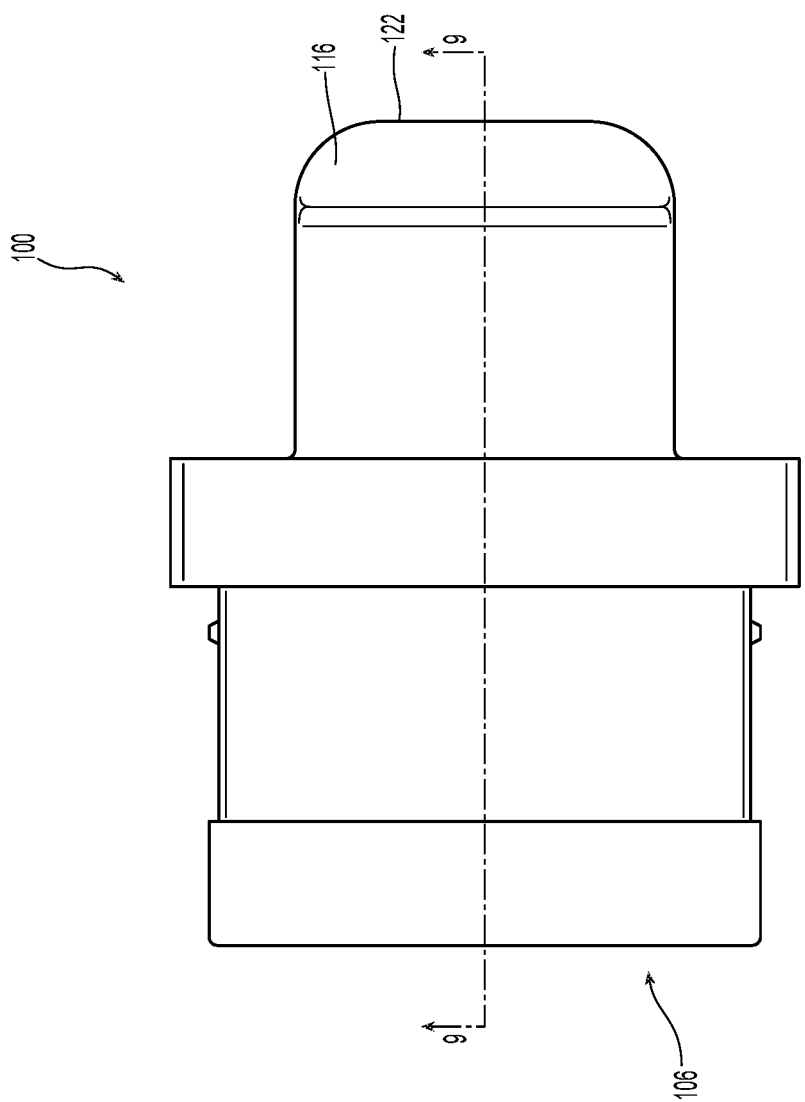
FIG. 8 is a top plan view of the adapter in FIG. 2.
Figure 9:
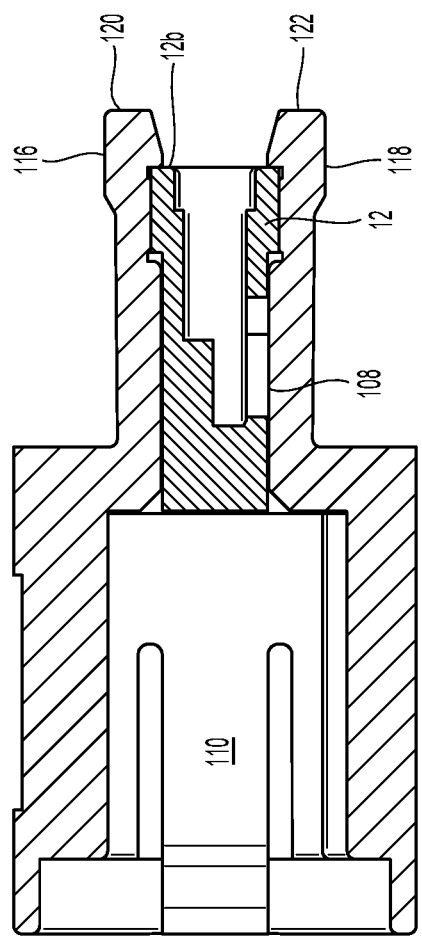
FIG. 9 is a cross sectional view of the adapter along line 9-9 in FIG. 8.

FIG. 9, which is a view along 9-9 of the top view of the adapter 100 in FIG. 8, further shows the multi-fiber ferrule 12 securely positioned inside the adapter 100. The end face of the ferrule 12 (where the optical fibers terminate) is shown at a mating plane inside the adapter 100, toward a central portion of the adapter body 102. It is at this mating plane where the fiber optic connector from the second side 106 mates with the multi-fiber ferrule 12.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An adapter for holding a multi-fiber ferrule in position to mate with a multi-fiber ferrule in a fiber optic connector comprising:
    an adapter body, the adapter body having a first side and a second side;
    a first opening disposed in the first side of the adapter body and configured to receive the multi-fiber ferrule, the first opening having two shorter edges and two longer edges;
    a second opening disposed in the second side of the adapter body and in communication with the first opening, the second opening configured to removably receive the fiber optic connector and the first and second openings configured to position the fiber optic connector and multi-fiber ferrule to optically align with one another; and
    a pair of latches connected to the adapter and disposed adjacent the first opening to engage and hold the multi-fiber ferrule in the adapter, the pair of latches attached to an outer surface of the adapter body along the longer edges of the first opening and extending in a direction away from the first and the second openings, the pair of latches having a terminal end and a non-uniform thickness between the adapter body and a latch stop adjacent the terminal ends, the pair of latches having an exterior surface, the exterior surface having a first surface and a second surface, the first surface lying in a first plane and the second surface lying in a second plane, the first plane and second plane being offset and parallel to each other, and wherein the first surface is closer to the first opening.

2. The adapter according to claim 1, wherein each of the pair of latches has an interior surface that faces the other of the pair of latches, each of the interior surfaces having a first portion with a first surface lying in a first plane and a second portion having a second surface lying in a second plane, the first and second planes being parallel to but offset from one another.

3. The adapter according to claim 2, wherein the first surfaces of the first portions are closer to one another than the second surfaces of the second portions.

4. The adapter according to claim 2, wherein the second portions are disposed between the first portions and the terminal ends.

5. The adapter according to claim 1, further comprising a pair of tabs connected to the adapter and disposed adjacent to the shorter edges of the first opening.

6. The adapter according to claim 1, wherein the pair of tabs and the pair of latches limit the movement of the multi-fiber ferrule inserted therein.

7. The adapter according to claim 2, wherein the latch stop is disposed between the second portion and the terminal end of each of the pair of latches.

8. The adapter according to claim 2, wherein the first portion is divided into subportions, each of the subportions having a surface that lies in the first plane.

9. The adapter according to claim 2, wherein the second portion is divided into subportions, each of the subportions having a surface that lies in the second plane.

10. An adapter for holding a multi-fiber ferrule in position to mate with a multi-fiber ferrule in a fiber optic connector comprising:
    an adapter body, the adapter body having a first side and a second side;
    a first opening disposed in the first side of the adapter body and configured to receive the multi-fiber ferrule, the first opening having two shorter edges and two longer edges;
    a second opening being disposed in the second side of the adapter body and in communication with the first opening, the second opening configured to removably receive the fiber optic connector and the first and second openings configured to position the fiber optic connector and multi-fiber ferrule to optically align with one another; and a pair of latches attached to an outer surface of the adapter and disposed adjacent the first opening to engage and hold the multi-fiber ferrule in the adapter, the pair of latches connected to the adapter body along the longer edges of the first opening and extending in a direction away from the first and the second openings and having a terminal end, each of the pair of latches further comprising:
- a latch stop to engage a long edge of a back end-face of the multi-fiber ferrule adjacent the terminal end of the latch,
- a latch step extending from the latch perpendicular to the direction in which the latch extends and adjacent the first opening, and
- a pad extending from an internal surface of each latch and perpendicular to the direction in which the latch extends and positioned between the latch stop and the latch step to engage a rear portion of the multi-fiber ferrule.

11. The adapter according to claim 10, wherein the latch step on each of the pair of latches comprises a first portion having a first surface lying in a first plane and wherein the pad on each of the pair of latches comprises a second portion having a second surface lying in a second plane.

12. The adapter according to claim 11, wherein the first plane and the second plane are parallel to one another and offset from each other.

13. The adapter according to claim 10, wherein the latch stop on each of the pair of latches is disposed between the terminal end and the pad thereof.

14. The adapter according to claim 10, further comprising a pair of tabs connected to the adapter and disposed adjacent to the shorter edges of the first opening.

15. The adapter according to claim 11, wherein the latch step on each of the pair of latches is divided into subportions, each of the subportions having a surface that lies in the first plane.

16. The adapter according to claim 11, wherein the pad is divided into subportions, each of the subportions having a surface that lies in the second plane.

17. The adapter according to claim 10, wherein the pair of latches has a width and the latch stop is shorter than the width of each of the pair of latches.

18. The adapter according to claim 10, wherein on each of the pair of latches the latch step extends farther in the perpendicular direction than the does the pad.

* * * * *